March 24, 1959     E. R. PIERCE     2,879,115
NON-METALLIC MEANS FOR BONDING MATERIALS TOGETHER
Filed July 22, 1954
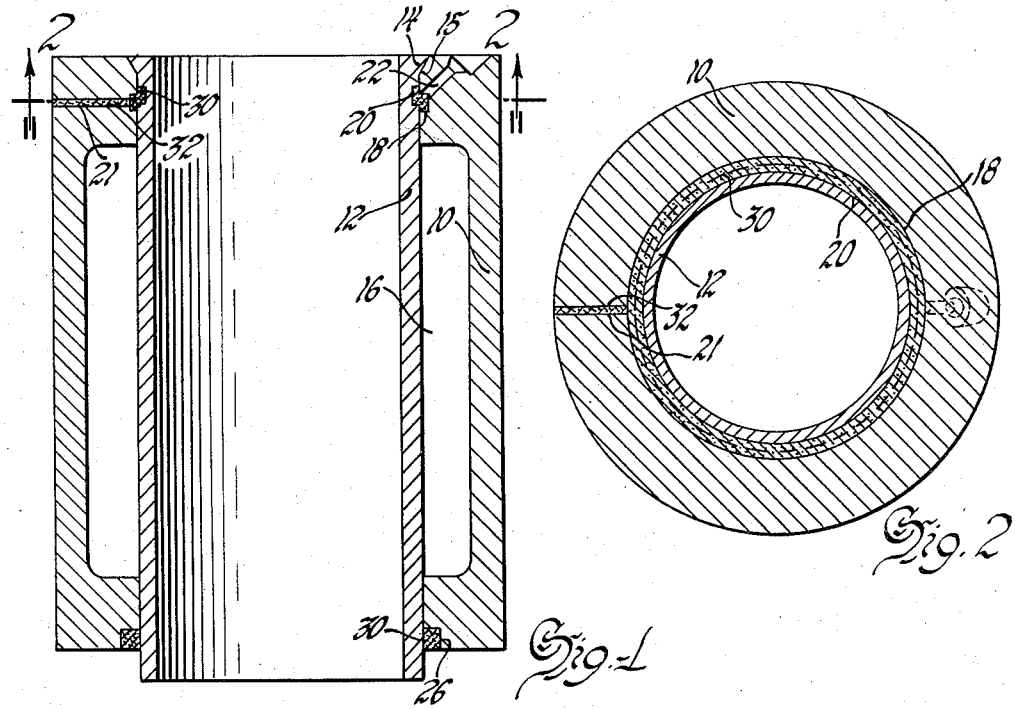
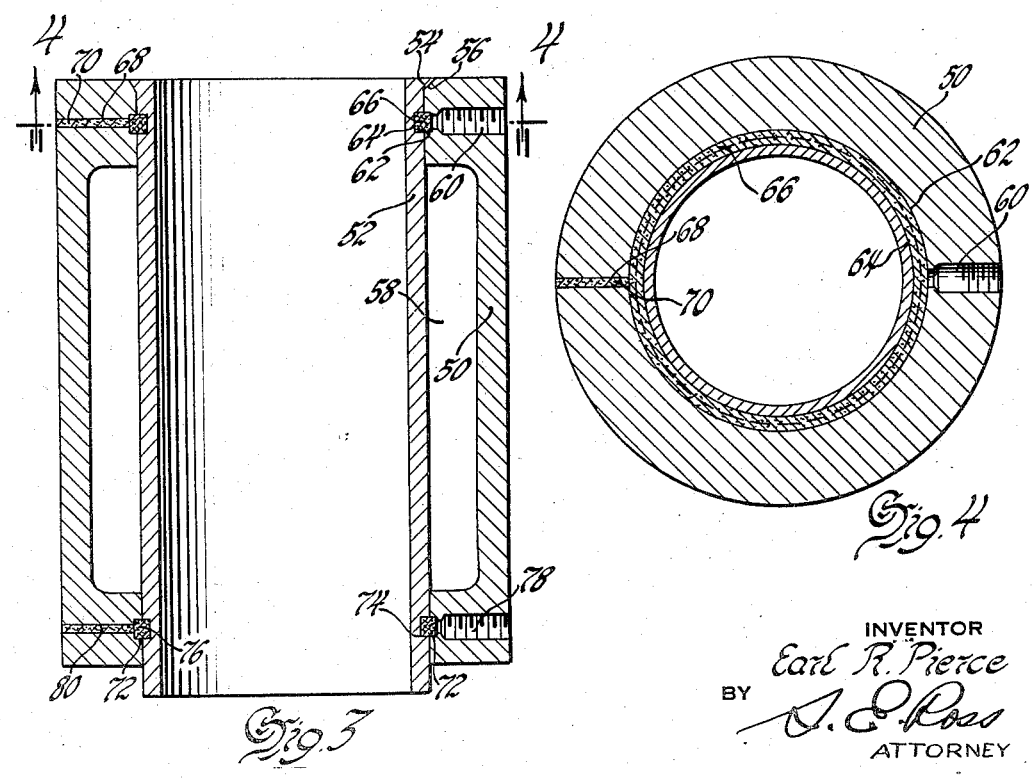
INVENTOR
Earl R. Pierce
BY
ATTORNEY

United States Patent Office 2,879,115
Patented Mar. 24, 1959

2,879,115

NON-METALLIC MEANS FOR BONDING MATERIALS TOGETHER

Earl R. Pierce, Birmingham, Mich., assignor to General Motors Corporation, Detroit, Mich., a corporation of Delaware Application July 22, 1954, Serial No. 445,089

5 Claims. (Cl. 309—3)

This invention relates to non-metallic means for bonding materials together and is more particularly concerned with bonding a cylinder liner in an engine block.

Various means have been proposed for installing wear resistant cylinder liners such as, for example, cast iron liners in aluminum blocks. Casting in place and brazing have been proposed. The casting method raises foundry problems while the brazing method involves expensive equipment. In addition the brazing method sometimes results in questionable bonds.

The primary object of the present invention is to provide a novel composite structure comprising members bonded together by non-metallic means, especially such a structure which can be produced by an inexpensive method. Other objects and advantages of the invention will become apparent as the description proceeds.

Reference is herewith made to the accompanying drawings in which:

Figure 1 is a longitudinal cross-sectional view of a cylinder liner and cylinder block in which the parts are bonded together by non-metallic means.

Figure 2 is a cross-sectional view on line 2—2 in Figure 1.

Figure 3 is a longitudinal cross-sectional view of another modification.

Figure 4 is a cross-sectional view on line 4—4 in Figure 3.

In the modification shown in Figures 1 and 2, there is illustrated an engine block 10 having bonded thereto a cylinder liner 12. As indicated, the upper portion of the liner has an outwardly tapered portion 14 seating on a conforming tapered portion 15 of the block. This provides a positive metallic seat for the liner. The block is so shaped as to form between it and the liner a space 16 for a cooling medium such as water, for example. Below the tapered portions, there is a circumferentially extending groove 18 in the block and a circumferentially extending groove 20 in the liner in communication with the groove in the block. The block also has a radially extending passage 21 connected to the circumferentially extending groove 18. Spaced 180° from the passage 21 is a passage 22. This last-mentioned passage is provided for the purpose of injecting a low temperature or other thermosetting resin into the composite opening formed by the circumferentially extending grooves in the liner and block. The passage 21 acts as a telltale to indicate when sufficient of the thermosetting resin has been injected to completely fill the circumferentially extending grooves and passage 21. The resin is shown at 30 in grooves and at 32 in the passage 21. After the resin has set, it acts to key the block and liner together. It is not necessary that great accuracy be required for the keying grooves 18 and 20 since the resin completely fills the space formed by these grooves. At the lower end of the block, there is shown a circumferentially extending groove 26 having therein a plastic material 30.

In the modification shown in Figures 3 and 4, there is provided an engine block 50, a cylinder liner 52, having a tapered portion 54 at the upper end thereof seating on a conforming tapered portion 56 of the block. This provides a positive metallic seat for the liner. The block is so shaped as to form with a portion of the outer surface of the cylinder liner a space 58 for a cooling medium. Adjacent the upper end of the block, there is provided a passage 60 which connects with a circumferentially extending groove 62 in the block. In the liner, there is provided a circumferentially extending groove 64 in alignment with the groove 62 in the block. These grooves are completely filled with a thermosetting resin as shown at 66. On the opposite side of the block from passage 60, there is a passage 68 leading from the grooves in the block and liner. The passage 68 acts as a telltale device to indicate when the grooves and passage are completely filled with the resin which is applied in plastic condition through passage 60 to the grooves 62 and 64 and then to passage 68. The resin in the passage 68 is indicated by 70. Near the lower end of the block, there is a circumferentially extending groove 72. In alignment with the groove 72 is a circumferentially extending groove 74 in the liner 52. Within the two grooves a thermosetting resin 76 acts to key the liner to the block. The resin in the plastic slot is applied through an opening 78 and a sufficient amount is employed to completely fill the grooves in the block and liner and also completely fill a passage 80.

The plastic materials employed are preferably those which contain no volatile materials; those that are non-shrinking when curing; those that permit reasonable control of curing time, that is those which on the one hand have an economical cure rate, and on the other, have long enough pot life to permit handling, say six to eight hours; and those which are not affected adversely by hydrocarbons or coolants. A very satisfactory material having these requirements is an all-solid, no solvent, low temperature curing epoxy-type resin with fibrous type filler catalyzed with an amine catalyst, such as "Armstrong A–6."

The epoxy resin may consist of a condensation product of epichlorohydrin with bisphenol or glycerol. This type resin works well for the upper joints in both of the modifications shown in the drawings and may be used also for the lower joints. However, the preferred material for the lower joint is an elastomer. This type material is preferred since this permits differential expansion of the metals making up the block and liner. For example, where the liner is of ferrous metal, such as cast iron or steel and the block is of aluminum, there will be differential expansion upon heating of the parts. Great strength at the lower joint is not required, merely resistance to oil and coolant.

A very satisfactory elastomer and shown at 30 in the open groove 26 in Figure 1 is an all-solid catalyzed Thiokol (Minnesota Mining E. C. 801) plastic. In general, the Thiokols are reaction products of such compounds as ethylene chloride or the like with sodium polysulphides.

It will be apparent that numerous modifications and changes in the embodiments of my invention described herein may be made by those skilled in the art without departing from the principles and spirit of the invention.

I claim:

1. A composite structure comprising a cylinder having upper and lower ends, a cylinder block surrounding said cylinder, said cylinder having a different coefficient of thermal expansion than said block, said cylinder and block having portions intermediate said ends spaced from each other to provide a coolant passage, said cylinder having an upper external circumferentially extending groove between said passage and said upper end and a lower external circumferentially extending groove between said passage and said lower end, said block having an upper internal circumferentially extending groove in communication with said upper cylinder groove and a lower internal circumferentially extending groove in communication with said lower cylinder groove, a rigid thermosetting resin material sealingly filling said upper intercommunicating grooves whereby said liner is keyed to said block, and an oil and coolant resistant elastomeric material sealingly filling said lower intercommunicating grooves.

2. A composite structure comprising a ferrous metal cylinder having upper and lower ends, an aluminum cylinder block surrounding said cylinder, said cylinder and block having portions intermediate said ends spaced from each other to provide a coolant passage, said cylinder having an upper external circumferentially extending groove between said passage and said upper end and a lower external circumferentially extending groove between said passage and said lower end, said block having an upper internal circumferentially extending groove in communication with said upper cylinder groove and a lower internal circumferentially extending groove in communication with said lower cylinder groove, a rigid thermosetting resin material sealingly filling said upper intercommunicating grooves whereby said liner is keyed to said block, and an elastomeric material sealingly filling said lower intercommunicating grooves.

3. A composite structure comprising a cylinder having upper and lower ends, a cylinder block surrounding said cylinder, said cylinder having a different coefficient of thermal expansion than said block, said cylinder and block having portions intermediate said ends spaced from each other to provide a coolant passage therebetween, said cylinder having an upper circumferentially extending groove between said passage and said upper end and a lower external circumferentially extending groove between said passage and said block end, said block having an upper internal circumferentially extending groove in communication with said upper cylinder groove and a lower internal circumferentially extending groove in communication with said lower cylinder groove, an epoxy resin sealingly filling said upper intercommunicating grooves whereby said block is keyed to said cylinder and an oil and coolant resistant elastomeric material sealingly filling said lower intercommunicating grooves.

4. A composite structure comprising a ferrous metal cylinder having upper and lower ends, a substantially aluminum cylinder block surrounding said cylinder, said cylinder and block having portions intermediate said ends spaced from each other to provide a coolant passage therebetween, said cylinder having an upper circumferentially extending groove between said passage and said upper end and a lower external circumferentially extending groove between said passage and said block end, said block having an upper internal circumferentially extending groove in communication with said upper cylinder groove and a lower internal circumferentially extending groove in communication with said lower cylinder groove, an epoxy resin sealingly filling said upper intercommunicating grooves whereby said block is keyed to said cylinder and an oil and coolant resistant elastomeric material sealingly filling said lower intercommunicating grooves.

5. A composite structure comprising a cylinder having upper and lower ends, a cylinder block surrounding said cylinder, said cylinder having a different coefficient of thermal expansion than said block, said cylinder and block having portions intermediate said ends spaced from each other to provide a coolant passage, said cylinder having an upper external circumferentially extending groove between said passage and said upper end and a lower external circumferentially extending groove between said passage and said lower end, said block having an upper internal circumferentially extending groove in communication with said upper cylinder groove and a lower internal circumferentially extending groove in communication with said lower cylinder groove, a rigid thermosetting resin material sealingly filling one set of said intercommunicating grooves whereby said liner is keyed to said block, and an oil and coolant resistant elastomeric material sealingly filling the other set of said intercommunicating grooves.

References Cited in the file of this patent

UNITED STATES PATENTS

| | | |
|---|---|---|
| 791,649 | Richards | June 6, 1905 |
| 806,783 | Dayton | Dec. 12, 1905 |
| 2,170,015 | Ford | Aug. 22, 1939 |
| 2,686,091 | Young | Aug. 10, 1954 |

FOREIGN PATENTS

| | | |
|---|---|---|
| 370,806 | Germany | Mar. 7, 1923 |